United States Patent
Nguyen et al.

(10) Patent No.: US 9,909,397 B2
(45) Date of Patent: Mar. 6, 2018

(54) METHODS OF FABRICATING SAND CONTROL SCREEN ASSEMBLIES USING THREE-DIMENSIONAL PRINTING

(71) Applicant: Halliburton Energy Services, Inc., Houston, TX (US)

(72) Inventors: Philip D. Nguyen, Houston, TX (US); James William Ogle, Spring, TX (US); Michael W. Sanders, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 347 days.

(21) Appl. No.: 14/648,880

(22) PCT Filed: Aug. 27, 2014

(86) PCT No.: PCT/US2014/052838
§ 371 (c)(1),
(2) Date: Jun. 1, 2015

(87) PCT Pub. No.: WO2016/032451
PCT Pub. Date: Mar. 3, 2016

(65) Prior Publication Data
US 2016/0258256 A1    Sep. 8, 2016

(51) Int. Cl.
*E21B 43/08*  (2006.01)
*B22F 3/10*   (2006.01)
(Continued)

(52) U.S. Cl.
CPC .............. *E21B 43/086* (2013.01); *B22F 3/10* (2013.01); *B22F 5/10* (2013.01); *B28B 1/001* (2013.01);
(Continued)

(58) Field of Classification Search
CPC ...... E21B 43/086; E21B 34/06; E21B 43/088; E21B 43/045; E21B 43/082; E21B 47/00
(Continued)

(56) References Cited

U.S. PATENT DOCUMENTS 5,293,935 A   3/1994  Arterbury et al.
5,838,360 A   11/1998 Harrold et al.
(Continued)

FOREIGN PATENT DOCUMENTS

| CN | 201943673 U   | 8/2011  |
|----|---------------|---------|
| WO | 0188332 A1    | 11/2001 |
| WO | 2004111384 A1 | 12/2004 |
| WO | 2016032451 A1 | 3/2016  |

OTHER PUBLICATIONS

International Search Report and Written Opinion for PCT/US2014/052838 dated May 1, 2015.

*Primary Examiner* — Taras P Bemko
(74) *Attorney, Agent, or Firm* — McDermott Will & Emery LLP

(57) ABSTRACT

A method of fabricating a sand control screen assembly includes determining an anatomy of a facsimile sand control screen assembly, the sand control screen assembly including one or more component parts. A virtual three-dimensional (3D) model of the facsimile sand control screen assembly is then generated based on the anatomy. The virtual 3D model of the facsimile sand control screen assembly is provided to a 3D printer, and the 3D printer forms at least a portion of the facsimile sand control screen assembly based on the virtual 3D model.

26 Claims, 3 Drawing Sheets

(51) Int. Cl.
*B22F 5/10* (2006.01)
*B28B 1/00* (2006.01)
*B28B 17/00* (2006.01)
*B29C 67/00* (2017.01)
*E21B 34/06* (2006.01)
*G05B 19/4099* (2006.01)
*B33Y 10/00* (2015.01)
*B33Y 50/02* (2015.01)
*E21B 43/04* (2006.01)
*E21B 47/00* (2012.01)

(52) U.S. Cl.
CPC ...... *B28B 17/0063* (2013.01); *B29C 67/0051* (2013.01); *B29C 67/0088* (2013.01); *E21B 34/06* (2013.01); *E21B 43/088* (2013.01); *G05B 19/4099* (2013.01); *B33Y 10/00* (2014.12); *B33Y 50/02* (2014.12); *E21B 43/045* (2013.01); *E21B 43/082* (2013.01); *E21B 47/00* (2013.01); *G05B 2219/49023* (2013.01)

(58) Field of Classification Search
USPC ..................................................... 166/244.1
See application file for complete search history.

(56) References Cited

U.S. PATENT DOCUMENTS

| | | | |
|---|---|---|---|
| 7,144,242 B2 | 12/2006 | Silverbrook | |
| 7,243,724 B2 | 7/2007 | McGregor et al. | |
| 7,283,276 B2 | 10/2007 | Tacke | |
| 7,556,329 B2 | 7/2009 | Silverbrook | |
| 7,766,641 B2 | 8/2010 | Silverbrook | |
| 8,414,281 B2 | 4/2013 | Schleiss et al. | |
| 2002/0178582 A1* | 12/2002 | Echols | B01D 29/15 29/896.61 |
| 2008/0028891 A1 | 2/2008 | Calnan et al. | |
| 2011/0196125 A1* | 8/2011 | Wann | C08L 67/04 528/354 |
| 2011/0265990 A1 | 11/2011 | Augustine et al. | |
| 2012/0013482 A1* | 1/2012 | Patel | E21B 17/028 340/854.8 |
| 2012/0132427 A1* | 5/2012 | Renshaw | E21B 33/1208 166/313 |
| 2013/0247475 A1* | 9/2013 | Lind | B22F 3/26 51/297 |
| 2013/0320598 A1 | 12/2013 | Atkins et al. | |
| 2015/0079362 A1* | 3/2015 | Yang | C08F 267/06 428/209 |

* cited by examiner

METHODS OF FABRICATING SAND CONTROL SCREEN ASSEMBLIES USING THREE-DIMENSIONAL PRINTING

BACKGROUND

The present disclosure is related to methods of fabricating sand control screen assemblies used in the oil and gas industry and, more particularly, to using three-dimensional printing techniques to fabricate sand control screen assemblies and their associated apparatus.

In the course of completing an oil and/or gas well, it is common practice to run a string of protective casing into the wellbore and then to run a production tubing inside the casing. At the well site, the casing is perforated across one or more production zones to allow production fluids to enter the interior of the casing. In some completions, the well bore is uncased, and an open face is established across the production zones. During production of fluids derived from the production zones, formation sand and other solid particulates are also often swept into the flow path and into the casing. The formation sand is relatively fine sand that can erode production components in the flow path.

To prevent or mitigate the production of formation sand and other solid particulates during production operations, one or more sand screens are commonly installed in the flow path between the production tubing and the perforated casing (cased) or the open wellbore face (uncased). The sand screens and their various components are used as a filter medium designed to allow fluids derived from the formation to flow therethrough but substantially prevent the influx of particulate matter of a predetermined size.

One type of sand screen is a slotted liner made by cutting multiple slots of a predetermined gauge into base pipe. Fluids are able to pass into the base pipe via the slots, while particulates larger than the predetermined gauge are substantially prevented from traversing the slots. Another type of sand screen is a wire-wrapped screen, which consists of an outer jacket including a shaped wire that is simultaneously wrapped and welded to longitudinal rods or ribs that extend along the outer surface of a perforated base pipe. The wire is wrapped about the base pipe multiple times to provide predetermined gap or gauge between adjacent turns and then welded at each end to the production tubing. Fluids passing through the wire wrap are able to enter the production tubing through one or more flow ports defined in the production tubing below the screen jacket.

Another type of sand screen is a sintered metal screen, which consists of placing a sintered metal sleeve over a perforated base pipe. The filter medium for the sintered metal screen is a sintered metal powder that is pressed against a stainless steel lattice screen to provide structural support for the filtration medium. The sintered metal sleeve contains a predetermined flow area and acts as the filtration medium, while the base pipe provides tensile strength and collapse resistance. Yet another type of sand screen is a porous metal membrane screen, which consists of multiple layers (3 or 4) of porous metal membrane (PMM) positioned between an underlying drainage and overlying protecting mesh screen. Each PMM provides a predetermined percentage of open area through variable-sized pore openings and they are each placed concentrically between a perforated base pipe and a perforated outer shroud.

Fabricating the aforementioned sand screens can be a time-consuming and intricate process that requires a great deal of precision to ensure that proper sizes, geometry, and flow gauges are met.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to methods of fabricating sand control screen assemblies used in the oil and gas industry and, more particularly, to using three-dimensional printing techniques to fabricate sand control screen assemblies and their associated apparatus.

Manufacturing sand control screen assemblies requires a significant amount of labor and accuracy in precisely aligning and placing component parts of the sand control screen assembly within desired dimensions and configurations. According to the present disclosure, sand control screen assemblies, and their related component parts and apparatus, may be fabricated using a three-dimensional (3D) printer and otherwise using 3D printing technology. Three-dimensional printers are essentially robots on demand that help overcome the complexity and time consumption of current manufacturing processes for sand control screen assemblies. Moreover, 3D printing provides flexibility to overcome the intricacy and precision required in manufacturing sand screens and other such equipment, thereby allowing a user to tailor a sand screen to meet requirements for effectively controlling production of formation sand particulates. Three-dimensional printing may also provide significant material cost savings, since only the material that is required to fabricate the sand control screen assembly is used during manufacture. The sand control screen assemblies fabricated using 3D printing technology may substantially replicate an actual sand control screen assembly in geometry and material composition and, therefore, may be introduced downhole to help undertake a variety of wellbore operations, such as production or injection.

Figure 1:
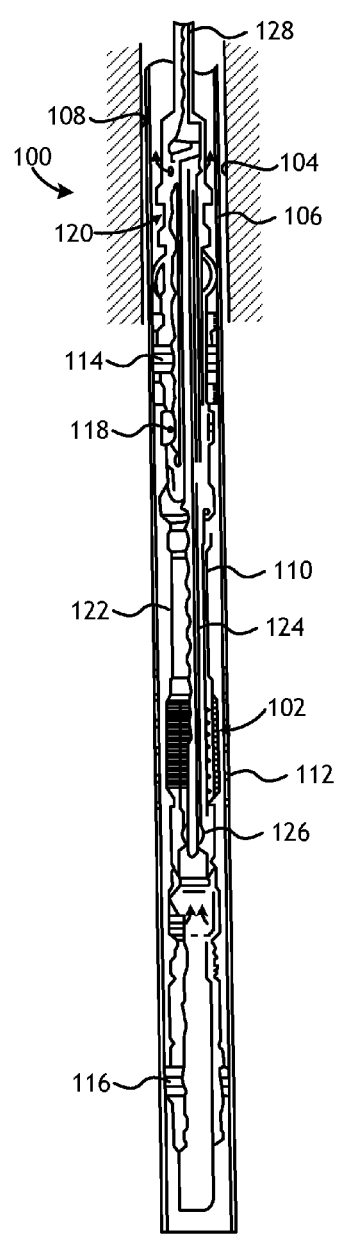
FIG. 1 is a schematic diagram of an exemplary well system that may be able to use sand control screen assemblies fabricated using the methods described herein.

FIG. 1 is a schematic diagram of an exemplary well system 100 that may employ a sand control screen assembly 110 fabricated using the methods described herein. As illustrated, a wellbore 104 has been reinforced by a tubular casing 106 and sealed with cement 108. The casing 106 may be perforated with one or more perforations 112 or holes and may be formed in the casing/formation via a jetting action. A sand control screen assembly 110 has been run inside the casing 106, which has already been perforated with one or more openings or perforations 112 at the depth where production fluids are to flow from the producing zone of the well into the sand control screen assembly 110.

The sand control screen assembly 110 may include a sand screen 102, which may be located opposite the perforations 112 in the casing 106 as the sand control screen assembly 110 is run into the wellbore 104 on work string 128, which may include a production tubing extending therefrom. When run into the wellbore 104, the sand control screen assembly 110 may be located adjacent the perforations 112 by stinging into a lower packer 116, which has previously been located below the perforations 112. The sand control screen assembly 110 may include an upper packer 114 that may be set, thus isolating the perforated zone from the rest of the wellbore 104 above that point. This allows produced fluids to be routed to the surface by first flowing through the sand screen 102 or associated filter assembly (e.g., filtering out any produced solids) and then up through the production tubing and work string 128, which may have been later run and stung into the upper packer 114 above the sand control screen assembly 110.

Flow ports 118 are provided in the sand control screen assembly 110 below the upper packer 114 and above the sand screen 102. Gravel, which may be mixed with water or gel, is injected or circulated into the work string 128 and is pumped down to the flow ports 118 between the upper packer 114 and the sand screen 102. The gravel and water/gel slurry is then pumped into an annulus 122 formed by the casing 106 (or open hole) and the sand control screen assembly 110. A wash pipe 124 may be run inside the sand screen 102 to provide a conduit back to the surface for the water or gel that was used to transport the gravel slurry into the annulus 122 between the casing 106 (or open hole) and the sand screen 102. The gravel slurry is dehydrated by the water or gel flowing through the sand screen 102, into the wash pipe 124, crossing over to the annulus between the casing 106 and the work string 128 above the upper packer 114, and then up that annulus and out of the well. A polished bore nipple 126 may be run below the sand control screen assembly 110 and landed in sealing engagement, which is located between the sand screen 102 and a lower screen (not shown), also referred to as a tell-tale screen, in order to force the fluid to the bottom of the sand control screen assembly 110 prior to gravel packing the sand screen 102. When the annulus 122 between the casing 106 and the sand control screen assembly 110 is fully packed with gravel, the wash pipe 124 may be pulled out of the polished nipple 126 and a service seal unit 120 may be pulled out of engagement with the upper packer 114 by retracting the work string 128.

Figure 2:
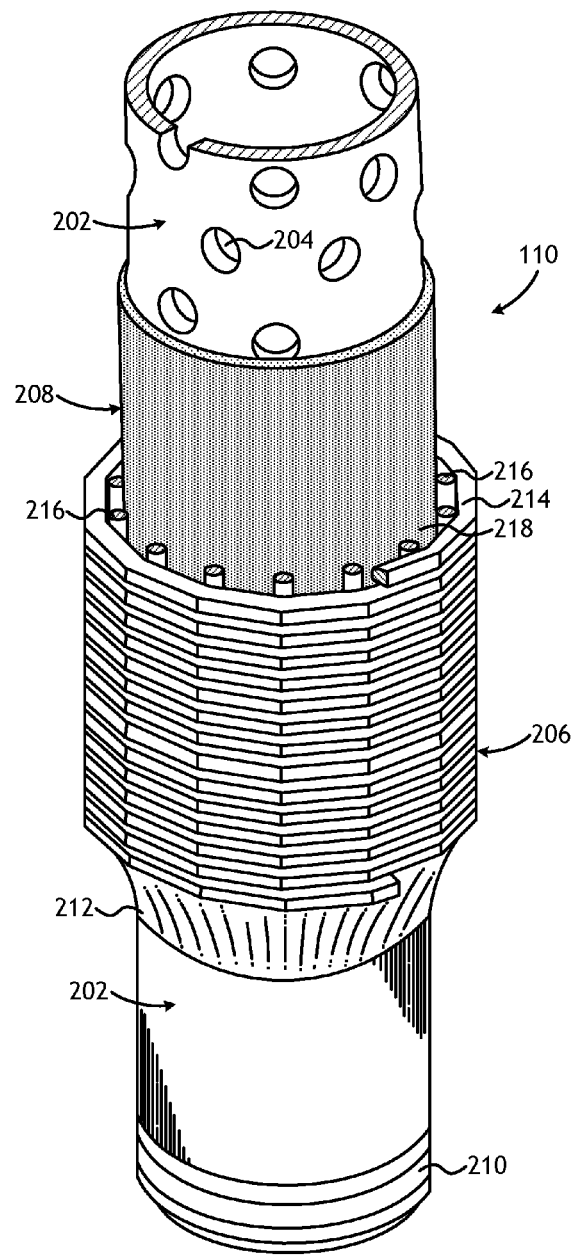
FIG. 2 is a schematic diagram of an exemplary embodiment of the sand control screen assembly of FIG. 1.

FIG. 2 is a schematic diagram of an exemplary embodiment of the sand control screen assembly 110. As illustrated, the sand control screen assembly 110 may be a pre-packed assembly that includes a perforated base pipe 202 of a predetermined length (e.g., 20 feet). The base pipe 202 may be perforated by one or more radial bore flow ports 204, which, in at least one embodiment, follow parallel spiral paths along the length of the base pipe 202. The flow ports 204 provide for fluid flow through the base pipe 202 to the extent permitted by a wire wrap sand screen 206 and a prepack screen 208. The flow ports 204 may be arranged in any desired pattern and may vary in number in accordance with the area needed to accommodate the expected formation fluid flow through the production tubing.

The perforated base pipe 202 may include a threaded pin connection 210 at its opposite ends for threaded coupling with, for example, the polished nipple 126 and the production tubing of FIG. 1. The wire wrap sand screen 206 may be attached onto the base pipe 202 at opposite end portions thereof by annular end welds 212 (one shown). The wire wrap sand screen 206 may be a fluid-porous, particulate-restricting member that is formed separately from the base pipe 202 or, in some cases, the wire wrap sand screen 206 may be placed directly on the base pipe 202. In at least one embodiment, the wire wrap sand screen 206 may include a screen wire 214 wrapped in multiple turns onto longitudinally extending ribs 216, thereby resulting in a helical wire wrap. In some embodiments, the turns of the screen wire 214 may be longitudinally spaced from each other, thereby providing defining rectangular fluid flow apertures of a predetermined flow gauge between adjacent turns of the screen wire 214. The apertures are framed by the longitudinal ribs 216 and wire turns for conducting formation fluid flow while excluding sand and other unconsolidated formation material larger than the predetermined flow gauge.

In other embodiments, however, the wire wrap sand screen 206 may comprise a porous metal membrane screen, which consists of multiple layers of a weave mesh wire material (i.e., a porous metal membrane) having a uniform pore structure and a controlled pore size that is determined based on properties of the formation where the sand control screen assembly 110 is to be used. Suitable porous metal membrane screens may include, but are not limited to, a plain Dutch weave, a twilled Dutch weave, a reverse Dutch weave, combinations thereof, or the like. In other embodiments, however, the wire wrap sand screen 206 may include a single porous metal membrane screen, multiple porous metal membrane screens that are not bonded together, a single layer of the screen wire 214, multiple layers of the screen wire 214 or the like, that may or may not operate with a drainage layer.

The screen wire 214 and the longitudinal ribs 216 may be formed of stainless steel or other weldable materials and may be joined together by resistance welds at each crossing point of the screen wire 214 onto the longitudinal ribs 216. The resulting wire wrap sand screen 206 is a unitary assembly that is self-supporting prior to being mounted onto the base pipe 202. The longitudinal ribs 216 are circumferentially spaced with respect to each other and have a predetermined diameter for establishing a prepack annulus 218 of an appropriate size for receiving the prepack screen 208. The longitudinal ribs 216 serve as spacers between the prepack screen 208 and the wire wrap sand screen 206.

In at least one embodiment, the prepack screen 208 is concentrically disposed about the base pipe 202, and is concentrically disposed in the prepack annulus 218 inside of the wire wrap sand screen 206. The prepack screen 208 is thus stabilized by engagement against the base pipe 202 and the wire wrap sand screen 206. In some embodiments, the prepack screen 208 may be comprised of a unitary, porous body of sintered powdered metal. The metal may be a corrosion resistant metal, such as stainless steel or nickel and nickel chromium alloys, such as are sold under the trademarks MONEL® and INCONEL®. Preferably, the sintered metal of the prepack screen 208 provides a matrix having a pore size of about 10-150 microns, corresponding generally to a gauge of about 10-60 mesh. In other embodiments, the prepack screen 208 may comprise resin-coated sand, without departing from the scope of the disclosure.

The prepack screen 208 and the wire wrap sand screen 206 may be capable of withstanding rough handling during transportation and run-in, as well as extreme downhole well conditions, such as a temperature range of from about 50° C. to about 300° C., a formation fluid pH of from about 6 to about 12, high formation pressure up to about 2,000 psi, and contact with corrosive formation fluids containing sulfurous compounds such as hydrogen sulfide or sulfur dioxide in concentrations up to about 20% by weight. While the prepack screen 208 is depicted in FIG. 2 as interposing the base pipe 202 and the wire wrap sand screen 206, those skilled in the art will readily recognize that the wire wrap sand screen 206 and associated longitudinal ribs 216 may alternatively be omitted without departing from the scope of the disclosure.

Figure 3:
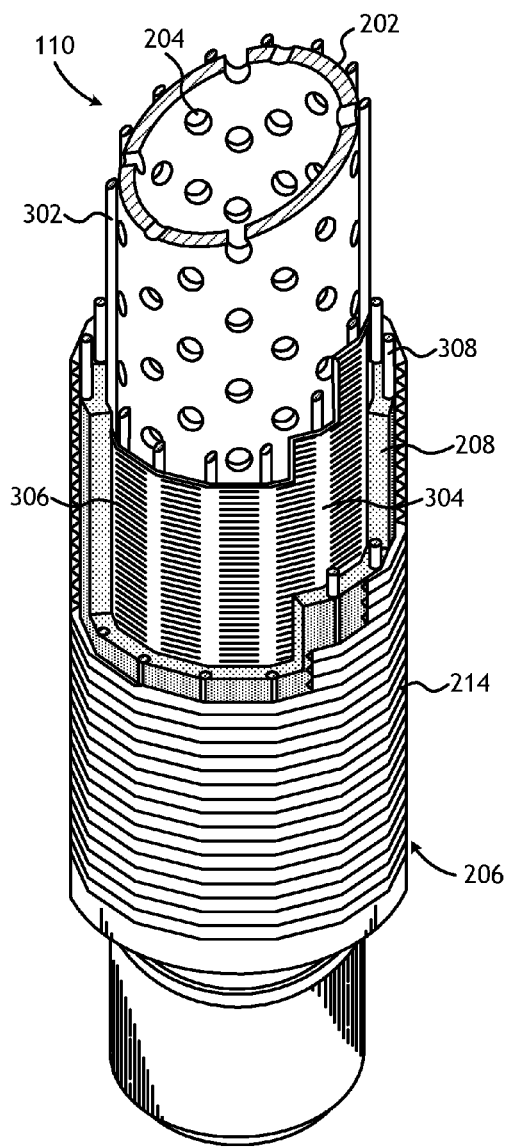
FIG. 3 is a schematic diagram of another exemplary embodiment of the sand control screen assembly of FIG. 1.
Figure 4:
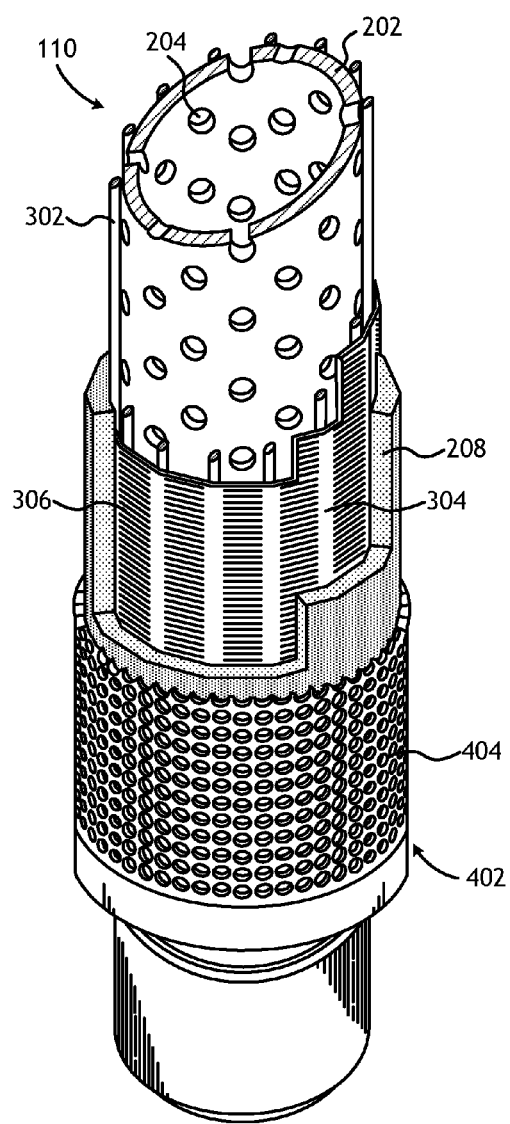
FIG. 4 is a schematic diagram of another exemplary embodiment of the sand control screen assembly of FIG. 1.

FIGS. 3 and 4 depict additional exemplary embodiments of the sand control screen assembly 110 of FIG. 1. Like numerals introduced in FIG. 2 and used in FIGS. 3 and 4 correspond to like components that will not be described again in detail. As depicted, the sand control screen assemblies 110 of FIGS. 3 and 4 each include the base pipe 202 having the plurality of flow ports 204 defined therein and a first plurality of ribs 302 positioned about the exterior of the base pipe 202. A slotted screen 304 including a plurality of slots 306 may be positioned or otherwise wrapped around the ribs 302. As illustrated, the slots 306 are defined in the slotted screen 304 in a substantially horizontal pattern. In other embodiments, the slots 306 may be defined in the slotted screen 304 in a vertical or slanted pattern, without departing from the scope of the disclosure.

In FIG. 3, a second plurality of ribs 308 may be disposed or positioned about the slotted screen 304. The screen wire 214 of the wire wrap sand screen 206 may be wrapped around the ribs 308, as generally described above. The prepack screen 208 may be disposed in the annular area between the inner slotted screen 304 and the outer screen wire 214. Together, the first plurality of ribs 302, the slotted screen 304, the prepack screen 208, the second plurality of ribs 308, and the wire wrap sand screen 206 form the sand control screen assembly 110 of FIG. 3.

In FIG. 4, the wire wrap sand screen 206 of FIGS. 2 and 3 is replaced with a perforated shroud 402 that defines a plurality of openings 404. The openings 404 are depicted as being generally circular in shape. In other embodiments, however, the openings 404 may exhibit other shapes, such as ovoid or polygonal, without departing from the scope of the disclosure. The prepack screen 208 may be disposed in the annular area between the screen 304 and the perforated shroud 402. Together, the ribs 302, the slotted screen 304, the prepack screen 208, and the perforated shroud 402 form the sand control screen assembly 110 of FIG. 4.

As will be appreciated, the above-described sand control screen assemblies 110 of FIGS. 2-4 are merely examples and are described for illustrative purposes in understanding the presently described methods. Those skilled in the art will readily appreciate that any of the component parts of the sand control screen assemblies 110 may be had in any combination, without departing from the scope of the disclosure. In at least one embodiment, for example, the sand control screen assembly 110 may comprise only the slotted screen 304 without any of the other components or only the prepack screen 208 disposed about the base pipe 202. Moreover, it will be appreciated that numerous other types and designs of the sand control screen assembly 110 may equally be employed in the well system 100 of FIG. 1 and otherwise fabricated using the methods described herein. In at least one embodiment, for instance, the sand control screen assembly 110 may be similar to or the same as any of the sand control screens described and depicted in co-owned U.S. Pat. No. 7,243,724.

According to the present disclosure, the sand control screen assemblies 110 of FIGS. 1-4 and their related component parts, or any other known type of sand control screen assembly, may be fabricated using a three-dimensional (3D) printer and otherwise using 3D printing technology. Three-dimensional printing is a process of making a 3D solid object from a virtual 3D model. The process of 3D printing uses an additive process, in which successive two-dimensional ("2D") cross-sectional layers are progressively laid down in different shapes and using different "ink" compositions (i.e., printing materials) under computer control. A 3D solid object or facsimile may be printed based on a virtual 3D representation of the object from computer files, such as computer-aided design ("CAD") files. Such virtual 3D representations or models may be actual size or to scale and thereafter printed in 3D to generate a physical replica and facsimile of the virtual 3D model.

Figure 5:
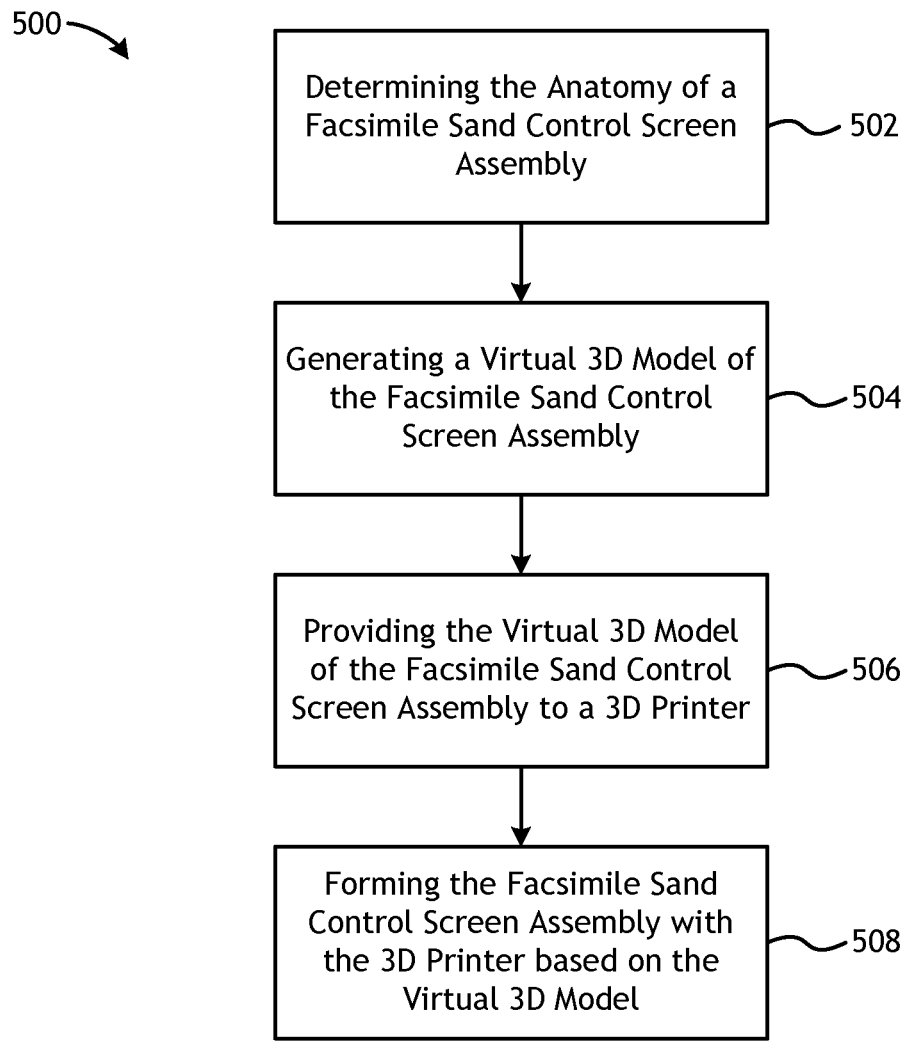
FIG. 5 is a schematic flow chart for an exemplary method of fabricating a facsimile sand control screen assembly.

Referring to FIG. 5, depicted is a schematic flow chart for an exemplary method 500 of fabricating a facsimile sand control screen assembly, according to one or more embodiments. The method 500 may be useful in fabricating 3D facsimiles of the sand control screen assemblies 110 of FIG. 1-4 or 3D facsimiles of any other known sand control screen assemblies. As used herein, the term "facsimile sand control screen assembly" refers to a physical sand control screen assembly that is designed, printed, or designed and printed using 3D printing technology. As used herein, the term "actual sand control screen assembly" refers to a physical or tangible sand control screen assembly or the design (e.g., blueprints, drawings, schematics, etc.) of a sand control screen assembly.

The method 500 may first include determining the anatomy of a facsimile sand control screen assembly, as at 502. The "anatomy" of the facsimile sand control screen assembly can refer to several things including, but not limited to, the dimensions of the facsimile sand control screen assembly and each of its component parts. Accordingly, determining the anatomy of the facsimile sand control screen assembly may include obtaining or otherwise measuring the dimensions and geometry of each component part of the facsimile sand control screen assembly. For instance, this may include determining the geometry and gauge of all slots, holes, and perforations in embodiments where slotted screens or perforated shrouds are to be replicated. This may further include determining gap widths between adjacent wires or strands where wire wrap, wire mesh, and/or porous metal membrane sand screens are to be replicated. This may further include determining a desired pore throat size and resulting flow area of sintered materials (e.g., metals) where a sintered metal screen is to be replicated.

Exemplary component parts of the facsimile sand control screen assembly include, but are not limited to, a base pipe and any flow ports defined therein, concentric tubulars, a sand screen (e.g., wire wrapped, wire mesh, porous metal membrane etc.), a slotted screen, a perforated shroud, a sintered metal screen, longitudinally-extending ribs, a control line, a wash pipe, a cross-over tool, shunt tubes, a treatment fluid channel, an inflow control device, an inflow control valve, and the like.

In determining the anatomy of the facsimile sand control screen assembly, a user may reference an existing or actual sand control screen assembly or the design of an actual sand control screen assembly. In some embodiments, for example, the dimensions and geometry of the facsimile sand control screen assembly may be obtained by referencing manufacturer drawings or blueprints corresponding to the design of an actual sand control screen assembly. In other embodiments, the dimensions and geometry of the facsimile sand control screen assembly may be obtained manually by physically measuring the dimensions and geometry of each component part of an actual sand control screen assembly to be replicated. In yet other embodiments, the dimensions and geometry of the facsimile sand control screen assembly may be obtained by scanning each component part of an actual sand control screen assembly using a 3D scanner, or through x-ray diffraction, near-infrared spectroscopy, scanning electron microscopy, x-ray computed tomography, and any combination thereof. X-ray diffraction, near-infrared spectroscopy, and scanning electron microscopy are each able to produce 3D images of objects by scanning them with a focused beam of electrons. X-ray computed tomography uses computer-processed x-rays to produce tomographic 3D images of an object.

The anatomy of the facsimile sand control screen assembly can also refer to the chemical, metallurgical, or material composition of each component part of the facsimile sand control screen assembly. Accordingly, determining the anatomy of the facsimile sand control screen assembly, as at 502, may further include obtaining or otherwise ascertaining the chemical, metallurgical, or material composition of each component part of the facsimile sand control screen assembly. In some embodiments, the user may select a desired chemical, metallurgical, or material composition for each component part in creating the facsimile sand control screen assembly. In other embodiments, the chemical, metallurgical, or material composition of each component part of the facsimile sand control screen assembly may be obtained by referencing manufacturer drawings, blueprints, or material orders for an actual sand control screen assembly.

In yet other embodiments, the chemical, metallurgical, or material composition of each component part of the facsimile sand control screen assembly may be ascertained by detecting the appropriate chemical, metallurgical, or material composition of each component part through at least one of x-ray diffraction, near-infrared spectroscopy, energy-dispersive x-ray spectroscopy, and any combination thereof. X-ray diffraction involves the identification of the atomic and molecular structure of an object by measuring the angles and intensities of diffracted x-ray beams therefrom to produce a 3D image of electron density and the mean positions of atoms therein. Near-infrared spectroscopy ("NIRS") is a spectroscopic method that uses the near-infrared region of electromagnetic radiation to extract desired chemical information and produce a 3D image, if desired. Alternatively, multivariate calibration techniques (e.g., principal component analysis, partial least squares, and the like) may be employed to extract chemical information using NIRS and/or optical coherence tomography techniques may be used to create a desired 3D image. Energy-dispersive x-ray spectroscopy relies on the interaction of x-ray excitation with an object to perform elemental analysis or chemical characterization based on each element having a unique anatomic structure corresponding to peaks on its x-ray spectrum.

After the anatomy of the facsimile sand control screen assembly is determined, a virtual 3D model of the facsimile sand control screen assembly may be generated based on the anatomy data, as at 504. This may be accomplished by inputting the data corresponding to the anatomy of the facsimile sand control screen assembly into a computer and, more particularly, loading the data into a software program executable by the computer. The software program may be a non-transitory, computer readable medium programmed with computer executable instructions that, when executed by a processor associated with the computer, generates a virtual 3D model of the facsimile sand control screen assembly based on the anatomy input data. Any available computer readable format may be used to generate the virtual 3D model, such as a computer modeling or CAD software program, which may or may not be geared toward the oil and gas industry.

In some embodiments, the virtual 3D model may be represented by successive 2D cross-sectional layers in the computer modeling software program. More particularly, the virtual 3D model may be input into the computer modeling software program as a whole, and the computer modeling software program may be programmed or otherwise configured to form or generate successive 2D cross-sectional layers of the virtual 3D model. In other cases, the method or methodology of obtaining the anatomy data used to generate the virtual 3D model may itself provide the successive 2D cross-sectional layers.

In some embodiments, generating the virtual 3D model of the facsimile sand control screen assembly, as at 504, may include generating virtual 3D models of only one or some of the component parts of the facsimile sand control screen assembly.

The virtual 3D model of the facsimile sand control screen assembly may then be provided to a 3D printer, as at 506. The 3D printer may be any commercially available 3D printer that is compatible with the computer readable format and computer modeling software program used to generate the virtual 3D model of the facsimile sand control screen assembly. In some embodiments, the entire virtual 3D model of the facsimile sand control screen assembly may be transmitted to the 3D printer. In other embodiments, however, only one or some of the component parts of the facsimile sand control screen assembly may be transmitted, without departing from the scope of the disclosure.

After the virtual 3D model of the facsimile sand control screen assembly is provided to the 3D printer, the 3D printer may then be directed to form the facsimile sand control screen assembly based on the virtual 3D model, as at 508. To accomplish this, the 3D printer may proceed by progressively forming or "printing" the successive 2D cross-sectional layers atop one another to form a physical 3D version of the facsimile sand control screen assembly. The 3D printer may execute several methodologies in printing the facsimile sand control screen assembly including, but not limited to, fused deposition modeling, electron beam freeform fabrication, direct metal laser sintering, electron-beam melting, selective laser melting, selective heat sintering, selective laser sintering, maskless mesoscale materials deposition, and any combination thereof.

In some embodiments, the facsimile sand control screen assembly may be printed as a whole, such as over the course of a single, continuous printing process. In other embodiments, however, some or all of the component parts of the facsimile sand control screen assembly may be printed separately and subsequently assembled manually to form the facsimile sand control screen assembly.

In printing the facsimile sand control screen assembly, or individually printing its component parts, the 3D printer may use any "ink" or "printing material" that is compatible with the 3D printer and otherwise mimics or substantially mimics the chemical, metallurgical, or material composition of the actual sand control screen assembly being replicated. That is, in some embodiments, a printing material that is similar chemically, metallurgically, or materially to each component part of the actual sand control screen assembly may be used, even if it is not identical in chemical, metallurgical, or material composition. In instances where a chemical, metallurgical, or material composition of a component part may not be mimicked, an alternative printing material may be selected based on its ability to react or behave in a similar or identical way to the actual chemical, metallurgical, or material composition of the component part. Such printing materials may include those naturally occurring in subterranean formations that are capable of being dispensed by the 3D printer and otherwise capable of binding together (alone or in the presence of a binder) to form a cohesive portion of the facsimile sand control screen assembly. In other embodiments, such materials may not be selected based on their similarity or identical nature to the chemical, metallurgical, or material composition of a component part.

Suitable printing materials for forming the facsimile sand control screen assembly may include, but are not limited to, a thermoplastic, a conductive plastic composite, a rubber, an elastomer, a eutectic metal, a metal alloy (e.g., stainless steel, nickel, and nickel chromium alloys), an elemental metal (e.g., aluminum, iron, etc.), a metal clay, a clay, a ceramic, a carbonate, silicon, silicon dioxide, magnesium oxide, calcium, a degradable material, a composite material, and any combination thereof. As can be appreciated, the 3D printer may be capable of printing as many facsimile sand control screen assemblies as needed, limited only by the availability of required printing materials or mimicked printing materials necessary to print the component parts of the facsimile sand control screen assembly.

In one or more embodiments, a degradable material may be printed on the outermost surface(s) of the facsimile sand control screen assembly, such as on an outer sand screen (e.g., the sand screen 206 of FIG. 2). As used herein, the term "degradable material" refers to any material or substance that is capable of or otherwise configured to degrade or dissolve following the passage of a predetermined amount of time or after interaction with a particular downhole environment (e.g., temperature, pressure, downhole fluid, treatment fluid, etc.). The degradable material may prove advantageous in protecting the outermost surface(s) of the facsimile sand control screen assembly from damage during run-in and installation downhole. After a predetermined period of time or following exposure to the wellbore environment, the degradable material may degrade or dissolve, and thereby enable the facsimile sand control screen assembly to operate as intended.

Suitable degradable materials include, but are not limited to, borate glasses, polyglycolic acid (PGA), polylactic acid (PLA), polylactic co-glycolic acid (PLGA), and a galvanically corrodible metal. Other suitable degradable materials include oil-degradable polymers, which may be either natural or synthetic polymers and include, but are not limited to, polyacrylics, polyamides, and polyolefins such as polyethylene, polypropylene, polyisobutylene, and polystyrene. Other suitable oil-degradable polymers include those that have a melting point that is such that it will dissolve at the temperature of the subterranean formation in which it is placed.

In addition to oil-degradable polymers, other degradable materials that may be used in conjunction with the embodiments of the present disclosure include, but are not limited to, degradable polymers, dehydrated salts, and/or mixtures of the two. As for degradable polymers, a polymer is considered to be "degradable" if the degradation is due to, in situ, a chemical and/or radical process such as hydrolysis, oxidation, or UV radiation. Suitable examples of degradable polymers that may be used in accordance with the embodiments of the present invention include polysaccharides such as guar; guar derivatives such as carboxymethylhydroxyethyl guar, hydroxyethyl guar, hydroxypropylguar; dextran or cellulose; chitins; chitosans; proteins; aliphatic polyesters; poly(lactides); poly(glycolides); poly(ϵ-caprolactones); poly(hydroxybutyrates); poly(anhydrides); aliphatic or aromatic polycarbonates; poly(orthoesters); poly(amino acids); poly(ethylene oxides); polyphosphazenes; their crosslinked versions, and copolymers of the above as well. Of these suitable polymers, as mentioned above, polyglycolic acid and polylactic acid may be preferred.

Polyanhydrides are another type of particularly suitable degradable polymer useful in the embodiments of the present invention. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

Blends of certain degradable materials may also be suitable. One example of a suitable blend of materials is a mixture of polylactic acid and sodium borate where the mixing of an acid and base could result in a neutral solution where this is desirable. Another example would include a blend of poly(lactic acid) and boric oxide. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly (lactic acid) may be suitable for higher temperature wells. Some stereoisomers of poly(lactide) or mixtures of such stereoisomers may be suitable for even higher temperature applications. Dehydrated salts may also be suitable for higher temperature wells.

In other embodiments, the degradable material may be a galvanically corrodible metal or material configured to degrade via an electrochemical process in which the galvanically corrodible metal corrodes in the presence of an electrolyte (e.g., brine or other salt fluids in a wellbore). Suitable galvanically-corrodible metals include, but are not limited to, gold, gold-platinum alloys, silver, nickel, nickel-copper alloys, nickel-chromium alloys, copper, copper alloys (e.g., brass, bronze, etc.), chromium, tin, aluminum, iron, zinc, magnesium, and beryllium.

In some embodiments, printing the facsimile sand control screen assembly, as at 508, may further include modifying a surface of one or more of the component parts of the facsimile sand control screen assembly during the printing process. In one embodiment, modifying the surface may include applying a surface coating, such as a polymer material, to the surface with the 3D printer. In another embodiment, modifying the surface may include altering the surface texture of one or more of the component parts. In at least one embodiment, modifying the surface may include a combination of applying a surface coating and altering the surface texture of one or more of the component parts. Modifying the surface may prove advantageous in preventing or mitigating scale crystallization and/or deposition on the affected component parts of the facsimile sand control screen assembly while in use downhole. For instance, micro patterning on outer surfaces of sand control screen assemblies, and associated inflow control valves and devices, has been shown to prevent scale buildup.

In some embodiments, printing the facsimile sand control screen assembly, as at 508, may include printing a slotted pipe, such as the slotted pipe 304 of FIGS. 3 and 4. Conventionally, the slots (e.g., the slots 306 in FIGS. 3 and 4) in a slotted pipe are made by cutting the slots into a base pipe with a saw blade having a desired width, or using a laser or water jet to cut the slots. Cutting the slots with a saw blade, however, limits the size (i.e., gauge) of the slots to a minimum width, below which the saw blade is unable to properly cut without damaging or breaking the blade. Today, slots are typically cut to a width of 0.025 inches, but can be cut as small as 0.012 inches. Cutting the slots using a laser or water jet results in the buildup of slag on the interior of the base pipe, which is undesirable since the slag can catch on downhole tools or the like extended within the base pipe during downhole operations. According to the present disclosure, the slotted pipe may alternatively be formed or printed using the 3D printer, which may provide a user with a slotted pipe having slot widths that are equal to or smaller than 0.012 inches and also free from slag on the interior.

In some embodiments, printing the facsimile sand control screen assembly, as at 508, may include printing a wash pipe, such as the wash pipe 124 of FIG. 1. In printing the wash pipe, the user may be able to print the wash pipe to desired inner and outer diameter dimensions. In horizontal gravel packing applications, well operators are often required to use available tubulars or pipe for the wash pipe, such as blast pipe, instead of using bona fide wash pipe. This is because typical wash pipe is not available in the correct size required to limit flow into the wash pipe outer diameter by the screen base pipe inner diameter annulus. According to the present disclosure, the wash pipe may alternatively be formed or printed using the 3D printer to specific inner and outer diameter dimensions dictated by the user based on the current wellbore operation. As will be appreciated, this may allow the user to select the wash pipe outer diameter with the proper wash pipe outer diameter by base pipe inner diameter ratio, which is typically 0.80.

Moreover, in some embodiments, the wash pipe may be printed and otherwise designed with one or more weak points along its axial length. Each weak point may comprise a decreased wall thickness at predetermined locations. Instead of requiring the use of a differential pressure valve associated with the facsimile sand control screen assembly, the weak point(s) in the wash pipe may be configured to fail upon assuming a predetermined pressure within the annulus between the base pipe and the wash pipe. The resulting failed wash pipe may provide an in situ "beta buster" used downhole. More particularly, in a horizontal gravel pack, the length of the assembly is largely controlled by the friction pressure in the system, which is related to the treating pressure. If the treating pressure exceeds the fracturing pressure of the formation, fluid losses can occur, which may stop the propagation of the sand pack in the wellbore adjacent the screen annulus. The fluid that is being dehydrated from the gel or brine-sand slurry is routed into the wash pipe outer diameter by the base pipe inner diameter annulus, down to the end of the wash pipe, and then up the inner diameter of the wash pipe and eventually back to the surface. In an Alpha/Beta packing process, the Beta wave or secondary wave of sand on top of the original wave of sand progresses from the toe of the well (the end of the well) back toward the heel of the well (higher up in the well) thus causing any fluid being dehydrated from the gel/brine-sand slurry to travel longer distances to get to the end of the wash pipe. This causes an increased friction pressure and thus an increased treating pressure. By providing weak points in the wash pipe, as discussed above, a user may circumvent that flow path and shorten the distance that the fluid has to travel to get to the inner diameter of the wash pipe. As will be appreciated, this may limit treating pressure, which, in turn, should allow the user to run longer sections of screen.

In some embodiments, printing the facsimile sand control screen assembly, as at 508, may include printing a sintered metal screen, such as the prepack screen 208 of FIGS. 2-4. Conventionally, sintered metal screens are made out of metal beads that are sintered together to form a permeable metal screen having a pore throat size resulting in a predetermined flow area. The flow area of conventional sintered metal screens is around 30%, and is highly dependent on conventional manufacturing processes, which are unable to decrease the flow area beyond a minimum threshold. Originally, the size of the metal beads was fixed and thus the sintered metal screens (also known as SINTERPAK®) provided for a set pore size, which, in turn, limited the size of solids it would be able to filter out of the produced fluids. Sintered metal screens could be used more frequently if the pore spaces could be better controlled to provide for some degree of freedom in selecting the size solids/particles that the sintered metal screen could filter out. According to the present disclosure, sintered metal screens may alternatively be formed or printed using the 3D printer to achieve desirable pore throat sizes having decreased flow areas. By using the 3D printer, the size of the metal beads may be made to any desired size and/or shape, thereby resulting in a screen which could filter out a wider distribution of particles.

The present disclosure allows several apparatus associated with the facsimile sand control sand screen assembly to be printed as part of the facsimile sand control screen assembly, rather than preparing such apparatus separately and then installing them as part of the facsimile sand control screen assembly at the well site. Such apparatus include, but are not limited to, wash pipes, shunt tubes, shunt systems, inflow control devices, inflow control valves, treatment fluid channels, and others.

In some embodiments, printing the facsimile sand control screen assembly, as at 508, may include printing conduits or rifle-drilled holes through elongate portions of the facsimile sand control screen assembly for the subsequent emplacement of control lines or the like. Such rifle-drilled holes, especially in lengths that are greater than 20 ft, for instance, are fairly difficult to drill. According to the present disclosure, however, such conduits or rifle-drilled holes through elongate portions of the facsimile sand control screen assembly may alternatively be formed during the printing process using the 3D printer. Control lines or other conveyances may then be placed in the pre-formed conduits or rifle-drilled holes following fabrication.

In some embodiments, during the process of printing the facsimile sand control screen assembly, one or more sensors may be manually placed or otherwise impregnated within or upon one or more component parts of the facsimile sand control screen assembly. The sensors, for instance, may be placed so as to form part of an outer sand screen (e.g., the sand screen 206 of FIG. 2), a base pipe (e.g., the base pipe 202 of FIGS. 2-4), an inflow control device, an inflow control valve, or the like. The placed sensor may have little or no impact on the anatomy of the facsimile sand control screen assembly, or the virtual 3D model of the facsimile sand control screen assembly may be designed to accept the sensor(s) at predetermined locations. In other embodiments, the sensor may be placed upon or otherwise adhered to the facsimile sand control screen assembly after 3D printing is completed.

Suitable sensors that may be included in the facsimile sand control screen assembly include, but are not limited to, a density sensor, a viscosity sensor, a resistivity sensor, an optical sensor, a temperature sensor, a flow rate sensor, a scale sensor, a strain sensor, a pressure sensor, an acoustic sensor, a flux sensor, a piezoresistive sensor, a capacitance sensor, and any combination thereof. The sensor(s) may be configured to operate while the facsimile sand control screen assembly is placed and used downhole. In some embodiments, the sensor(s) may be communicably coupled to a surface location and able to transmit measured or monitored data to the surface location in real-time or near real-time. In other embodiments, the sensor(s) may be communicably coupled to one or more data storage devices that may be accessed upon returning the facsimile sand control screen assembly to the surface to review any compiled and stored data.

In other embodiments, one or more sensors may be printed by the 3D printer simultaneously while printing the facsimile sand control screen assembly, as at 508. In such embodiments, the anatomy of a given sensor may be determined and a virtual 3D model of the given sensor may be generated and provided to the 3D printer for printing. The virtual 3D model of the facsimile sand control screen assembly may be manipulated to include the given sensor at a given location. Similar to the facsimile sand control screen assembly, the given sensor may be printed in successive 2D cross-sectional layers representative of its corresponding virtual 3D model.

Suitable printing materials for printing the one or more sensors may include any material suitable for use in achieving the sensing functions of the sensors listed above. Such materials may include, but are not limited to, an optical material, a glass, a plastic, a conductive plastic composite, a carbon black material, copper, a copper alloy, a tracer, and any combination thereof. In addition to the printed sensors, one or more of a resistor, inductor, capacitor, filter, microbattery, and the like may also be included in the facsimile sand control screen assembly described herein to help operate the sensors. In embodiments where the sensor is made of a tracer material, or a tracer-like material, the sensor may prove advantageous in providing a well operator with an indication of degradation or corrosion of one or more component parts of the facsimile sand control screen assembly. For instance, as an affected component part begins to degrade or corrode, a sensor made of a tracer material may also begin to degrade or corrode and thereby eject the tracer into wellbore fluids detectable at a surface location or otherwise. In some cases, a tracer material may change color when it undergoes stress, such as shear, in a non-reversible manner.

Embodiments disclosed herein include:

A. A method that includes determining an anatomy of a facsimile sand control screen assembly, the sand control screen assembly including one or more component parts, generating a virtual three-dimensional (3D) model of the facsimile sand control screen assembly based on the anatomy, providing the virtual 3D model of the facsimile sand control screen assembly to a 3D printer, and forming at least a portion of the facsimile sand control screen assembly with the 3D printer based on the virtual 3D model.

B. A method that includes extending a facsimile sand control sand screen assembly on a work string into a wellbore, the facsimile sand control sand screen assembly including one or more component parts and having been fabricated by determining an anatomy of the facsimile sand control screen assembly, generating a virtual three-dimensional (3D) model of the facsimile sand control screen assembly based on the anatomy, providing the virtual 3D model of the facsimile sand control screen assembly to a 3D printer, and forming at least a portion of the facsimile sand control screen assembly with the 3D printer based on the virtual 3D model, and undertaking one or more wellbore operations while the facsimile sand control screen assembly is positioned in the wellbore.

Each of embodiments A and B may have one or more of the following additional elements in any combination: Element 1: wherein the one or more component parts are parts selected from the group consisting of a base pipe, concentric tubulars, a sand screen, a slotted screen, a perforated shroud, a sintered metal screen, a longitudinally-extending rib, a control line, a wash pipe, a cross-over tool, a shunt tube, an inflow control device, an inflow control valve, and a treatment fluid channel. Element 2: wherein determining the anatomy of the facsimile sand control screen assembly comprises obtaining dimensions and geometry of the one or more component parts. Element 3: wherein obtaining dimensions and geometry of the one or more component parts comprises referencing at least one of manufacturer drawings and blueprints corresponding to a design of an actual sand control screen assembly. Element 4: wherein obtaining dimensions and geometry of the one or more component parts comprises manually measuring the dimensions and the geometry of each component part of an actual sand control screen assembly. Element 5: wherein obtaining dimensions and geometry of the one or more component parts comprises scanning each component part of an actual sand control screen assembly. Element 6: wherein determining the anatomy of the facsimile sand control screen assembly comprises obtaining at least one of a chemical, a metallurgical, and a material composition of the one or more component parts. Element 7: wherein obtaining the at least one of a chemical, a metallurgical, and a material composition of the one or more component parts comprises referencing at least one of manufacturer drawings, blueprints and material orders corresponding to an actual sand control screen assembly. Element 8: wherein obtaining the at least one of a chemical, a metallurgical, and a material composition of the one or more component parts comprises detecting the chemical, the metallurgical, or the material composition of each component part using at least one of x-ray diffraction, near-infrared spectroscopy, and energy-dispersive x-ray spectroscopy. Element 9: wherein forming the at least a portion of the facsimile sand control screen assembly comprises forming the entire facsimile sand control screen assembly over the course of a single, continuous printing process. Element 10: wherein forming the at least a portion of the facsimile sand control screen assembly further comprises individually printing the one or more component parts, and assembling the one or more component parts together to provide the facsimile sand control screen assembly. Element 11: wherein forming the at least a portion of the facsimile sand control screen assembly further comprises printing the facsimile sand control screen assembly with printing materials selected from the group consisting of a thermoplastic, a conductive plastic composite, a rubber, an elastomer, a eutectic metal, a metal alloy, an elemental metal, a metal clay, a clay, a ceramic, a carbonate, silicon, silicon dioxide, magnesium oxide, calcium, a degradable material, a composite material, and any combination thereof. Element 12: wherein forming the at least a portion of the facsimile sand control screen assembly further comprises printing a degradable material on an outermost surface of at least one of the one or more component parts, the degradable material being selected from the group consisting of a borate glass, polyglycolic acid, polylactic acid, polylactic co-glycolic acid, a galvanically-corrodible metal, an oil degradable polymer, a degradable polymer, a dehydrated salt, and any combination thereof. Element 13: wherein forming the at least a portion of the facsimile sand control screen assembly further comprises modifying a surface of at least one of the one or more of the component parts while forming the at least a portion of the facsimile sand control screen assembly. Element 14: wherein modifying the surface of the at least one of the one or more of the component parts comprises applying a surface coating to the at least one of the one or more of the component parts with the 3D printer. Element 15: wherein modifying the surface of the at least one of the one or more of the component parts comprises altering a surface texture of the at least one of the one or more of the component parts with the 3D printer. Element 16: wherein the one or more component parts comprises a slotted pipe having a plurality of slots defined therein, and wherein forming the at least a portion of the facsimile sand control screen assembly comprises printing the slotted pipe with the 3D printer such that a width of each slot is less than 0.012 inches. Element 17: further comprising manually placing one or more sensors on at least one of the one or more component parts while forming the at least a portion of the facsimile sand control screen assembly. Element 18: further comprising printing one or more sensors on at least one of the one or more component parts with the 3D printer while forming the at least a portion of the facsimile sand control screen assembly.

Element 19: wherein the one or more component parts are parts selected from the group consisting of a base pipe, concentric tubulars, a sand screen, a slotted screen, a perforated shroud, a sintered metal screen, a longitudinally-extending rib, a control line, a wash pipe, a cross-over tool, a shunt tube, an inflow control device, an inflow control valve, and a treatment fluid channel. Element 20: wherein determining the anatomy of the facsimile sand control screen assembly comprises obtaining dimensions and geometry of the one or more component parts. Element 21: wherein determining the anatomy of the facsimile sand control screen assembly comprises obtaining at least one of a chemical, a metallurgical, and a material composition of the one or more component parts. Element 22: wherein forming the at least a portion of the facsimile sand control screen assembly comprises forming the entire facsimile sand control screen assembly over the course of a single, continuous printing process. Element 23: wherein forming the at least a portion of the facsimile sand control screen assembly further comprises individually printing the one or more component parts, and assembling the one or more component parts together to provide the facsimile sand control screen assembly. Element 24: wherein forming the at least a portion of the facsimile sand control screen assembly further comprises printing a degradable material on an outermost surface of at least one of the one or more component parts, and allowing the degradable material to degrade within the wellbore, wherein the degradable material is selected from the group consisting of a borate glass, polyglycolic acid, polylactic acid, polylactic co-glycolic acid, a galvanically-corrodible metal, an oil degradable polymer, a degradable polymer, a dehydrated salt, and any combination thereof. Element 25: further comprising modifying a surface of at least one of the one or more of the component parts with the 3D printer while forming the at least a portion of the facsimile sand control screen assembly, and mitigating scale buildup on the surface of the at least one of the one or more of the component parts modified by the 3D printer while the facsimile sand control screen assembly is positioned in the wellbore. Element 26: further comprising placing one or more sensors on at least one of the one or more component parts while forming the at least a portion of the facsimile sand control screen assembly, and obtaining one or more measurements from the one or more sensors while the facsimile sand control screen assembly is positioned in the wellbore, wherein the one or more sensors are selected from the group consisting of a density sensor, a viscosity sensor, a resistivity sensor, an optical sensor, a temperature sensor, a flow rate sensor, a scale sensor, a strain sensor, a pressure sensor, an acoustic sensor, a flux sensor, a piezoresistive sensor, a capacitance sensor, and any combination thereof.

By way of non-limiting example, exemplary combinations applicable to A, B, C include: Element 2 with Element 3; Element 2 with Element 4; Element 2 with Element 5; Element 6 with Element 7; Element 6 with Element 8; Element 13 with Element 14; and Element 13 with Element 15.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

What is claimed is:
1. A method, comprising:
   determining an anatomy of a facsimile sand control screen assembly, the sand control screen assembly including one or more component parts;

generating a virtual three-dimensional (3D) model of the facsimile sand control screen assembly based on the anatomy;

providing the virtual 3D model of the facsimile sand control screen assembly to a 3D printer; and forming at least a portion of the facsimile sand control screen assembly with the 3D printer based on the virtual 3D model, wherein forming the at least a portion of the facsimile sand control screen assembly comprises modifying a surface of at least one of the one or more of the component parts by altering a surface texture of the at least one component part with the 3D printer.

2. The method of claim 1, wherein the one or more component parts are parts selected from the group consisting of a base pipe, concentric tubulars, a sand screen, a slotted screen, a perforated shroud, a sintered metal screen, a longitudinally-extending rib, a control line, a wash pipe, a cross-over tool, a shunt tube, an inflow control device, an inflow control valve, and a treatment fluid channel.

3. The method of claim 1, wherein determining the anatomy of the facsimile sand control screen assembly comprises obtaining dimensions and geometry of the one or more component parts.

4. The method of claim 3, wherein obtaining dimensions and geometry of the one or more component parts comprises referencing at least one of manufacturer drawings and blueprints corresponding to a design of an actual sand control screen assembly.

5. The method of claim 3, wherein obtaining dimensions and geometry of the one or more component parts comprises manually measuring the dimensions and the geometry of each component part of an actual sand control screen assembly.

6. The method of claim 3, wherein obtaining dimensions and geometry of the one or more component parts comprises scanning each component part of an actual sand control screen assembly.

7. The method of claim 1, wherein determining the anatomy of the facsimile sand control screen assembly comprises obtaining at least one of a chemical, a metallurgical, and a material composition of the one or more component parts.

8. The method of claim 7, wherein obtaining the at least one of a chemical, a metallurgical, and a material composition of the one or more component parts comprises referencing at least one of manufacturer drawings, blueprints and material orders corresponding to an actual sand control screen assembly.

9. The method of claim 7, wherein obtaining the at least one of a chemical, a metallurgical, and a material composition of the one or more component parts comprises detecting the chemical, the metallurgical, or the material composition of each component part using at least one of x-ray diffraction, near-infrared spectroscopy, and energy-dispersive x-ray spectroscopy.

10. The method of claim 1, wherein forming the at least a portion of the facsimile sand control screen assembly comprises forming the entire facsimile sand control screen assembly over the course of a single, continuous printing process.

11. The method of claim 1, wherein forming the at least a portion of the facsimile sand control screen assembly further comprises:

individually printing the one or more component parts; and assembling the one or more component parts together to provide the facsimile sand control screen assembly.

12. The method of claim 1, wherein forming the at least a portion of the facsimile sand control screen assembly further comprises printing the facsimile sand control screen assembly with printing materials selected from the group consisting of a thermoplastic, a conductive plastic composite, a rubber, an elastomer, a eutectic metal, a metal alloy, an elemental metal, a metal clay, a clay, a ceramic, a carbonate, silicon, silicon dioxide, magnesium oxide, calcium, a degradable material, a composite material, and any combination thereof.

13. The method of claim 1, wherein forming the at least a portion of the facsimile sand control screen assembly further comprises printing a degradable material on an outermost surface of at least one of the one or more component parts, the degradable material being selected from the group consisting of a borate glass, polyglycolic acid, polylactic acid, polylactic co-glycolic acid, a galvanically-corrodible metal, an oil degradable polymer, a degradable polymer, a dehydrated salt, and any combination thereof.

14. The method of claim 1, wherein modifying the surface of the at least one of the one or more of the component parts further comprises applying a surface coating to the at least one of the one or more of the component parts with the 3D printer.

15. The method of claim 1, wherein the one or more component parts comprises a slotted pipe having a plurality of slots defined therein, and wherein forming the at least a portion of the facsimile sand control screen assembly comprises printing the slotted pipe with the 3D printer such that a width of each slot is less than 0.012 inches.

16. The method of claim 1, further comprising manually placing one or more sensors on at least one of the one or more component parts while forming the at least a portion of the facsimile sand control screen assembly.

17. The method of claim 1, further comprising printing one or more sensors on at least one of the one or more component parts with the 3D printer while forming the at least a portion of the facsimile sand control screen assembly.

18. A method, comprising:

extending a facsimile sand control sand screen assembly on a work string into a wellbore, the facsimile sand control sand screen assembly including one or more component parts and having been fabricated by:

determining an anatomy of the facsimile sand control screen assembly;

generating a virtual three-dimensional (3D) model of the facsimile sand control screen assembly based on the anatomy;

providing the virtual 3D model of the facsimile sand control screen assembly to a 3D printer;

forming at least a portion of the facsimile sand control screen assembly with the 3D printer based on the virtual 3D model, wherein forming the at least a portion of the facsimile sand control screen assembly comprises modifying a surface of at least one of the one or more of the component parts by altering a surface texture of the at least one component part with the 3D printer; and undertaking one or more wellbore operations while the facsimile sand control screen assembly is positioned in the wellbore.

19. The method of claim 18, wherein the one or more component parts are parts selected from the group consisting of a base pipe, concentric tubulars, a sand screen, a slotted screen, a perforated shroud, a sintered metal screen, a longitudinally-extending rib, a control line, a wash pipe, a cross-over tool, a shunt tube, an inflow control device, an inflow control valve, and a treatment fluid channel.

20. The method of claim 18, wherein determining the anatomy of the facsimile sand control screen assembly comprises obtaining dimensions and geometry of the one or more component parts.

21. The method of claim 18, wherein determining the anatomy of the facsimile sand control screen assembly comprises obtaining at least one of a chemical, a metallurgical, and a material composition of the one or more component parts.

22. The method of claim 18, wherein forming the at least a portion of the facsimile sand control screen assembly comprises forming the entire facsimile sand control screen assembly over the course of a single, continuous printing process.

23. The method of claim 18, wherein forming the at least a portion of the facsimile sand control screen assembly further comprises:
individually printing the one or more component parts; and
assembling the one or more component parts together to provide the facsimile sand control screen assembly.

24. The method of claim 18, wherein forming the at least a portion of the facsimile sand control screen assembly further comprises:
printing a degradable material on an outermost surface of at least one of the one or more component parts; and
allowing the degradable material to degrade within the wellbore, wherein the degradable material is selected from the group consisting of a borate glass, polyglycolic acid, polylactic acid, polylactic co-glycolic acid, a galvanically-corrodible metal, an oil degradable polymer, a degradable polymer, a dehydrated salt, and any combination thereof.

25. The method of claim 18, further comprising:
mitigating scale buildup on the surface of the at least one of the one or more of the component parts modified by the 3D printer while the facsimile sand control screen assembly is positioned in the wellbore.

26. The method of claim 18, further comprising:
placing one or more sensors on at least one of the one or more component parts while forming the at least a portion of the facsimile sand control screen assembly; and
obtaining one or more measurements from the one or more sensors while the facsimile sand control screen assembly is positioned in the wellbore,
wherein the one or more sensors are selected from the group consisting of a density sensor, a viscosity sensor, a resistivity sensor, an optical sensor, a temperature sensor, a flow rate sensor, a scale sensor, a strain sensor, a pressure sensor, an acoustic sensor, a flux sensor, a piezoresistive sensor, a capacitance sensor, and any combination thereof.

* * * * *